United States Patent
Thompson et al.

(10) Patent No.: US 9,218,516 B2
(45) Date of Patent: Dec. 22, 2015

(54) DATA READER PLATTER WITH INTEGRAL FEATURES DELINEATING A DATA-READING SWEEP REGION

(71) Applicant: Datalogic ADC, Inc., Eugene, OR (US)

(72) Inventors: Ryan B. Thompson, Eugene, OR (US); David J. Newman, Eugene, OR (US); Alexander M. McQueen, Eugene, OR (US); Christopher N. Lenart, San Francisco, CA (US)

(73) Assignee: Datalogic ADC, Inc., Eugene, OR (US)

( * ) Notice: Subject to any disclaimer, the term of this patent is extended or adjusted under 35 U.S.C. 154(b) by 0 days.

(21) Appl. No.: 13/911,850

(22) Filed: Jun. 6, 2013

(65) Prior Publication Data

US 2013/0327835 A1    Dec. 12, 2013

Related U.S. Application Data

(60) Provisional application No. 61/657,690, filed on Jun. 8, 2012.

(51) Int. Cl.
   *G06K 7/10*    (2006.01)
   *G06K 7/015*   (2006.01)

(52) U.S. Cl.
   CPC .............. *G06K 7/015* (2013.01); *G06K 7/1096* (2013.01); *G06K 7/10831* (2013.01)

(58) Field of Classification Search
   CPC ... G06K 7/1096; G06K 7/10693; G06K 7/10; G06K 7/10616; G06K 7/10722; G06K 7/10861; G06K 19/06196; G06K 7/10623; G01G 19/4144; G07G 1/0045; G07G 1/0054; G03F 7/085
   USPC ......................................................... 235/470
   See application file for complete search history.

(56) References Cited

U.S. PATENT DOCUMENTS

| 4,078,164 | A | * | 3/1978 | Pelletier et al. .......... 219/121.69 |
| 4,933,539 | A | | 6/1990 | Stewart et al. |
| D320,011 | S | | 9/1991 | Fulton et al. |

(Continued)

FOREIGN PATENT DOCUMENTS

| GB | 2214842 A | 2/1988 |
| JP | 2007-333882 | 12/2007 |
| JP | 2009-288337 | 12/2009 |

OTHER PUBLICATIONS

International Searching Authority, International Search Report and Written Opinion for PCT/US2013/044814, Nov. 26, 2013.

(Continued)

*Primary Examiner* — Thien M Le
*Assistant Examiner* — Claude J Brown
(74) *Attorney, Agent, or Firm* — Stoel Rives LLP; Robert R. Teel

(57) ABSTRACT

Disclosed is a data reading system that includes a housing and a platter window for concealing a data reader configured to read an optical code borne by an item transported through a read zone. The read zone is defined at least in part by the platter window. The data reading system also has a platter supportable on the housing that encompasses the platter window. The platter includes a first integral feature and a second integral feature bordering opposing peripheral sides of the platter window. The first and second integral features cooperatively delineate a preferred data-reading sweep path through the read zone.

18 Claims, 6 Drawing Sheets

(56) References Cited

U.S. PATENT DOCUMENTS

| | | | |
|---|---|---|---|
| D320,012 S | 9/1991 | Fulton et al. | |
| 5,070,966 A | 12/1991 | Brennan | |
| D323,492 S | 1/1992 | Fulton et al. | |
| 5,164,324 A * | 11/1992 | Russell et al. | 438/708 |
| 5,665,955 A * | 9/1997 | Collins et al. | 235/462.14 |
| 5,677,111 A | 10/1997 | Ogawa | |
| 6,457,644 B1 * | 10/2002 | Collins et al. | 235/462.14 |
| 6,854,647 B2 * | 2/2005 | Collins et al. | 235/383 |
| 2001/0019104 A1 * | 9/2001 | Ohkawa et al. | 250/234 |
| 2002/0056750 A1 * | 5/2002 | Kato et al. | 235/454 |
| 2003/0090805 A1 * | 5/2003 | Ohkawa et al. | 359/629 |
| 2004/0159704 A1 * | 8/2004 | Kawai | 235/454 |
| 2004/0189472 A1 * | 9/2004 | Acosta et al. | 340/572.3 |
| 2008/0011856 A1 | 1/2008 | Bremer et al. | |
| 2010/0139989 A1 * | 6/2010 | Atwater et al. | 177/245 |
| 2010/0148967 A1 * | 6/2010 | Friend et al. | 340/572.3 |
| 2011/0168780 A1 | 7/2011 | McQueen et al. | |
| 2012/0138672 A1 * | 6/2012 | Herwig | 235/375 |
| 2013/0075168 A1 * | 3/2013 | Amundsen et al. | 177/1 |
| 2013/0181051 A1 * | 7/2013 | Olmstead et al. | 235/440 |
| 2013/0264391 A1 * | 10/2013 | Merenfeld | 235/494 |

OTHER PUBLICATIONS

ICL Datachecker, "Orion Scanner/Scale," brochure, available on or before May 22, 1989.

Datachecker Systems, Inc., "Orion Scanner and Scale Installation and Maintenance Manual," pp. A2-A4, 1989.

NCI, "NCI Model 4710 Scanner Scale," brochure, available on or before May 28, 2003.

PSC, Inc., "Magellan®, The World's Most Comprehensive Line of High-Performance Point-of-Scale Bar Code Scanners," 2003.

* cited by examiner

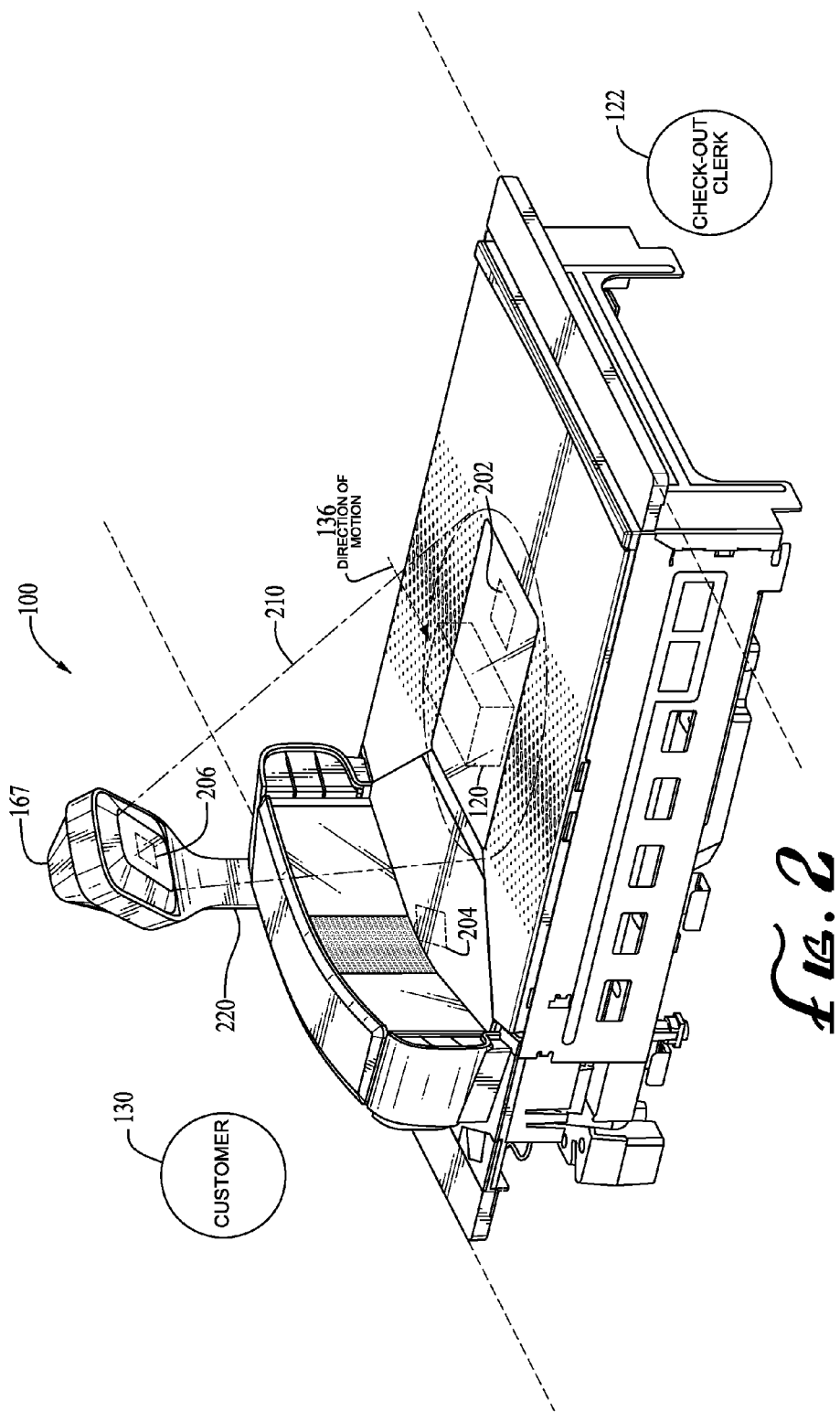

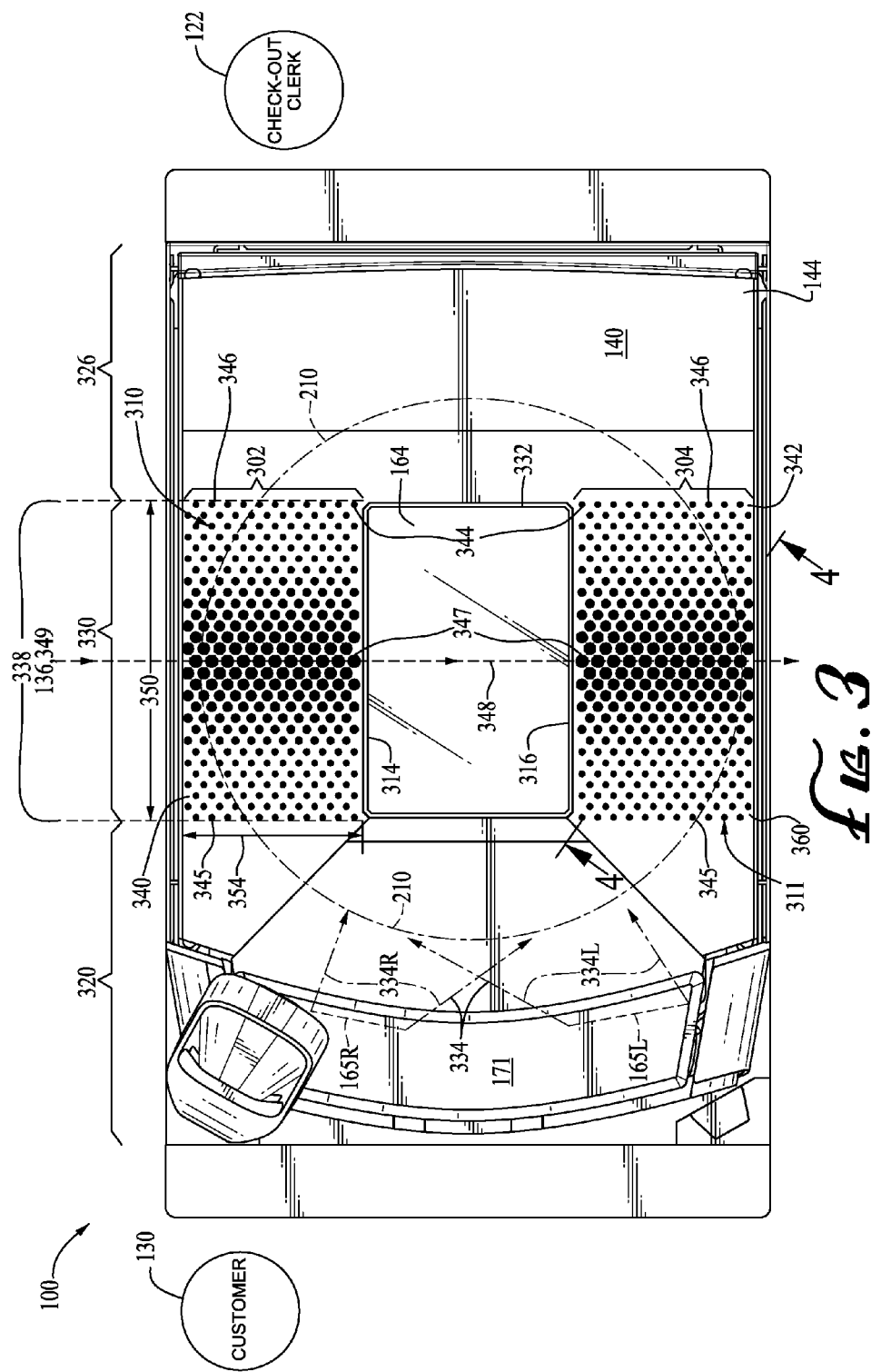

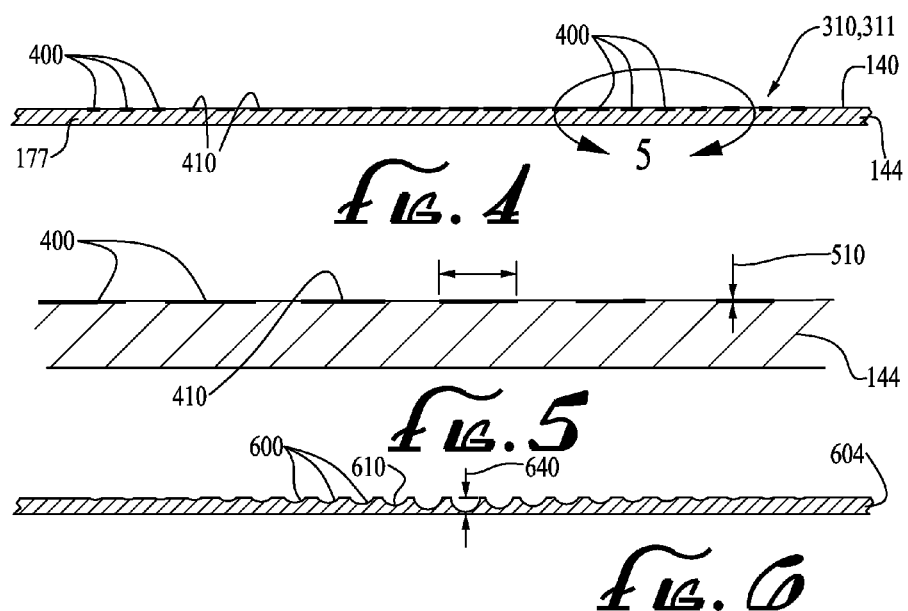
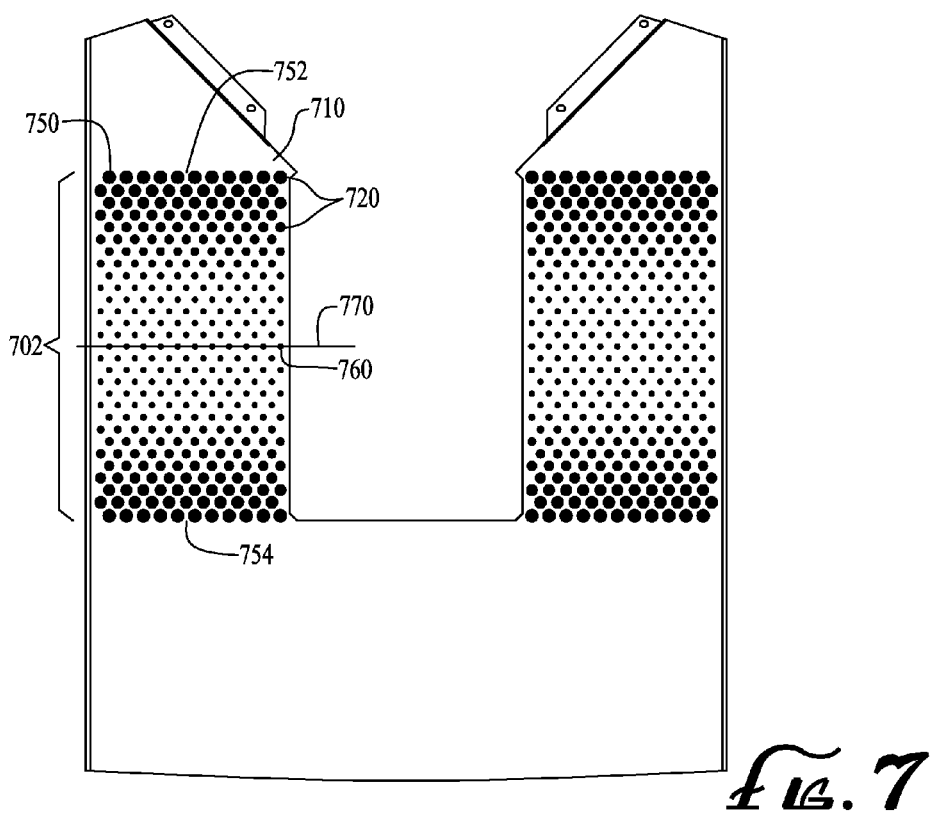

DATA READER PLATTER WITH INTEGRAL FEATURES DELINEATING A DATA-READING SWEEP REGION

RELATED APPLICATION

This application claims the benefit under 35 U.S.C. §119(e) of U.S. Provisional Patent Application No. 61/657,690, filed Jun. 8, 2012, which is hereby incorporated by reference in its entirety.

BACKGROUND INFORMATION

The field of this disclosure relates generally to systems and methods for data reading, and more particularly, to checkout station systems incorporating covers or weigh scale platters configured for use with data readers.

There are many types of optical codes that use various symbologies, including one-dimensional barcodes, such as a Universal Product Code (UPC) and EAN/JAN codes; stacked codes, such as PDF417; and two-dimensional codes, such as Maxicode codes. Such optical codes have widespread applications. For example, optical codes can be used to identify a class of items (e.g., merchandise) or unique items (e.g., patents). Thus, optical codes are found on a wide variety of items and objects, such as retail goods, company assets, and documents.

Optical code readers can be configured to acquire data from 1-D, stacked, and 2-D optical codes, as well as other types of optical codes or symbols and images of other items, such as biometric items. Two types of optical code readers used to acquire data associated with an optical code are laser scanners and imager-based optical code readers—the latter are also referred to as imaging readers. Both scanners and imaging readers may be referred to more generally as data readers, or simply, readers. Therefore, for purposes of the present disclosure, the terms scan and read may be used interchangeably to connote acquiring data associated with an optical code. Likewise, the terms scanner and imaging reader may be used interchangeably to connote devices used to acquire data associated with an optical code. Nevertheless, imaging readers actually employ a camera, imaging device, or sensor array, such as a charge coupled device (CCD) or complementary metal oxide semiconductor (CMOS) device to receive light reflected from an optical code and to thereby generate electronic image data (typically in digital form) representing the optical code. The image data is then processed to locate and decode the optical code.

Optical codes are typically placed on items and read or scanned by data readers to help track item movement in industrial or shipping facilities or to monitor sales and inventory at retail establishments. The optical codes are placed on or associated with items, packages, containers, or other objects to be read by the data reader when the items bearing the optical codes are passed through (i.e., swept past) a read zone during a data-reading operation. For example, in retail stores, data readers are placed at checkstands or are built into a checkstand counter and generally include one or more read volumes (or scan volumes) that combine to collectively establish a read zone in which optical codes may be successfully read. In other words, a read zone means one or more read volumes and the extent of the read zone is typically defined by a field-of-view (FOV) and a depth-of-field (DOF) of one or more associated imaging devices.

Previous attempts to delineate a single scan volume have relied on simple indicators or targets placed directly on scanner windows with adhesives or other bonds. These indicators easily wear off, occlude the scan volume, or simply fall off the scanner over time. Other attempts have indicated a small segment of a read zone using subtle arrows or other rudimentary marks.

Although some imaging readers are capable of using ambient light illumination, imaging readers typically utilize an artificial light source to illuminate an item in the read zone and to thereby provide sufficient signal response (i.e., exposure) for the data reader imaging device. In some instances, the illumination can be a distraction to users.

SUMMARY OF THE DISCLOSURE

The present disclosure describes a data reader platter suitable for reducing reflection, and it describes platters that convey to a user of the data reader a region where items bearing optical codes should be swept through a read zone, i.e., a path across the read zone where successful data reads will (or will not) likely occur. Systems include a platter (with or without a scale) that has integral features adjacent a centrally located platter window and configured to delineate the contours of a preferred data-reading sweep region. In one embodiment, the integral features are in the form of a graphic etch pattern of circles or other etched shapes at etch depths resistant to wear. In another embodiment, the integral features are in the form of depressions or other features that inhibit or dissuade a user from sliding items on the platter and thereby indicate keep-out zones delineating a preferred data-reading sweep region of the read zone that is typically located above a central portion of the platter. The present inventors have recognized that, in some instances, illumination is reflected from surrounding surfaces of the data reader and inadvertently toward a customer or checkout clerk operating the data reader. The integral features may include surface treatments or features that reduce specular reflection otherwise reflected by stainless steel or similar surfaces.

Additional aspects and advantages will be apparent from the following detailed description of preferred embodiments, which proceeds with reference to the accompanying drawings.

BRIEF DESCRIPTION OF THE DRAWINGS

Embodiments are described below with reference to accompanying drawings; however, the accompanying drawings depict only certain embodiments and are therefore not intended to limit the teachings of the present disclosure.

FIG. 2 is an isometric view of the data reader of FIG. 1 with a top-down imaging reader projecting a read volume onto a top-surface of the reader platter.

FIG. 3 is a top plan view of the data reader of FIGS. 1-2.

FIG. 4 is a cross-sectional view of the platter taken along lines 4-4 of FIG. 3.

FIG. 5 is an enlarged view of a portion the platter cross-section shown in FIG. 4.

FIG. 6 is a cross-sectional view of another embodiment of a graphic pattern atop a horizontal surface of the platter of FIGS. 1-3.

FIG. 7 is a top plan view of a portion of a platter, showing a graphic pattern according to another embodiment.

DETAILED DESCRIPTION OF EMBODIMENTS

For efficient use of a data reader, it is desirable to maximize a first-pass read rate by increasing the probability that an item will have its optical code successfully read on a single data-reading sweep across a read zone. For purposes of the present description, a region of the read zone that may tend to maximize a first-pass read rate for most items (and typically produces a successful read) is referred to as a preferred data-reading sweep region of the read zone.

For various reasons, the periphery of a preferred data-reading sweep region, as well as its general spatial location and dimensions with respect to a data reader, may be neither intuitive nor obvious to a user passing items through a read zone of the data reader. First, the read zone itself may be formed from one or more imaging devices that occasionally have partially overlapping read volumes configured to simultaneously read several sides of the item. For example, in both laser-based and imager-based types of readers, dual-plane or bioptic style readers have horizontally and vertically oriented imaging devices producing overlapping read volumes. Dual-plane or bioptic style readers are popular for high volume applications because they provide multiple overlapping perspectives (or fields of view) that establish a larger read zone, and they provide simultaneous views of several sides of an item. Overlapping perspectives are also generated by optics that subdivide a single perspective (i.e., a field of view) to produce a non-contiguous or irregular read volume for each imaging device. Consequently, a user may notice multiple imager-view windows that generally indicate orientation of imager perspectives, but the user may not understand how to efficiently expose all sides of an item to the appropriate (occasionally, subdivided) perspectives in a single sweep of the item through the read zone. Read zones configured to simultaneously read several sides of the item may be prone to cause user confusion. Second, the preferred data-reading sweep region is not visible because it is a three-dimensional space representing a sweep through the invisible read zone. Lack of clear delineation of a preferred data-reading sweep region leaves users guessing about how to maximize the first-pass read rate or how to efficiently pass items through the read zone.

Figure 1:
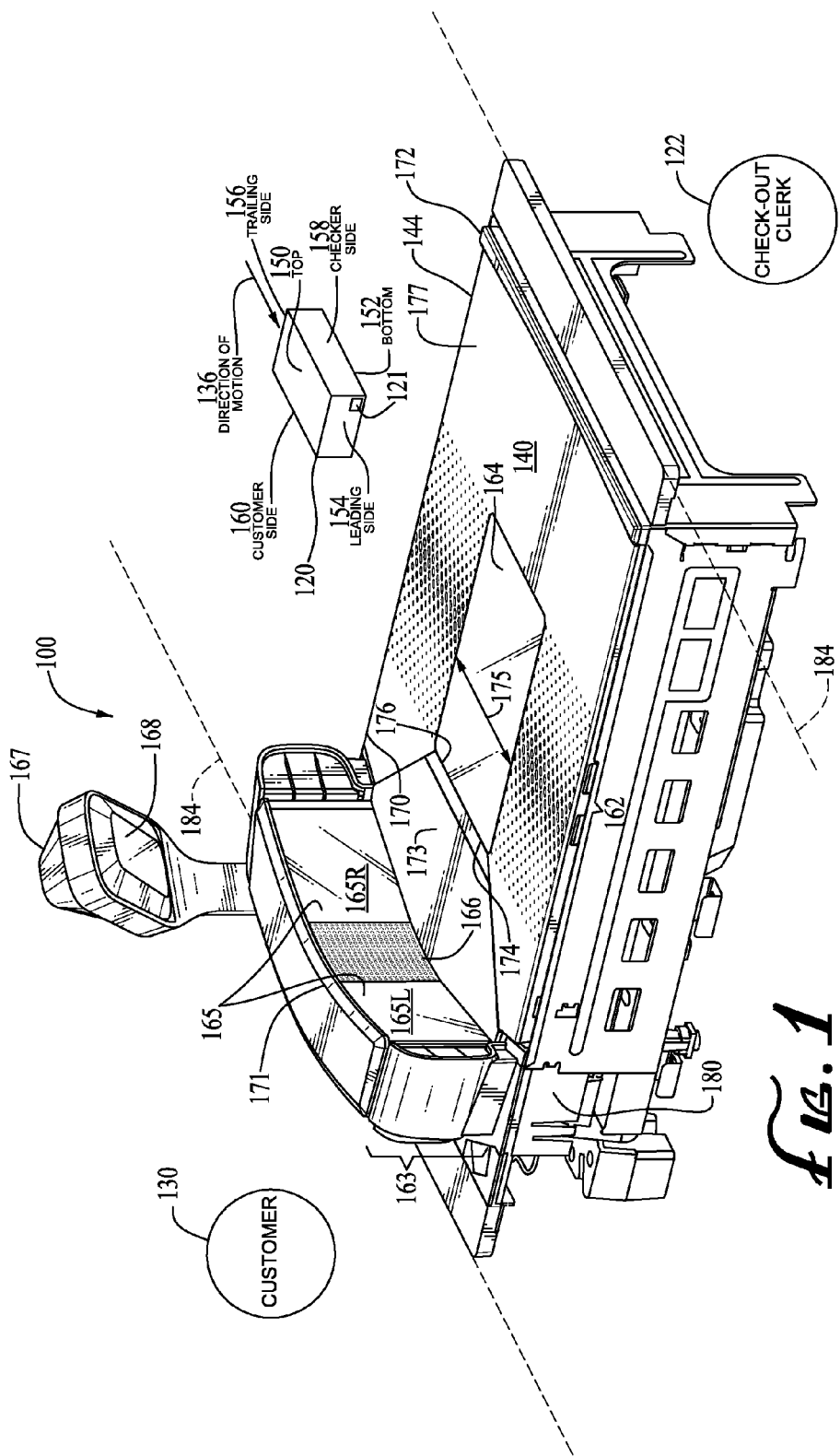
FIG. 1 is a top isometric view of a data reader showing an item being passed through a preferred data-reading sweep region, according to a first embodiment.

FIGS. 1-2 illustrate a data reader 100 and an item 120 with an optical code 121 that may be read by the data reader 100. For purposes of discussion, sides of the data reader 100 are referred to by corresponding locations of a checkout clerk 122, a customer 130, and a direction of motion 136 of the item 120. The item 120 is represented by a rectangular shaped six-sided polyhedron, such as a cereal box (hereinafter referred to as a box-shaped item, package, or object). Furthermore, sides of the item 120 are described with respect to its direction of motion 136 over a surface 140 of a cover or platter 144 of the data reader 100. For example, the item 120 has a top side 150, a bottom side 152, and four lateral sides 154, 156, 158, and 160. The lateral sides include the leading side 154, i.e., the side leading the item 120 as it is passed through a read zone (described with respect to FIG. 3, below), a trailing side 156 opposite the leading side 154, a checker side 158 (due to its proximity to the checkout clerk 122), and the customer side 160 (due to its proximity to the customer 130).

The locations of the checkout clerk 122 and the customer 130 are indicated to facilitate explanation and establish a relative frame of reference, but they are not intended as limiting the present disclosure. The data reader 100 is usable without the checkout clerk 122 or the customer 130, and either person can use the data reader 100 from any unobstructed location. In addition, the item 120 is described as a box-shaped package for ease of description, but the item 120 may have other shapes including cylindrical cans, fruit and other produce, or irregularly shaped packages, such as a bag of oranges, potato chips, or the like. Furthermore, the direction of motion 136 of the item 120 is illustrated as right-to-left (from the perspective of the checkout clerk 122), but other directions through a read zone (e.g., left-to-right) are equally applicable. Finally, length dimensions referred to below are measured parallel to the direction of motion 136; width dimensions are perpendicular, although this frame of reference is somewhat arbitrary.

The dual-plane data reader 100 includes a substantially horizontal section 162 and a substantially vertical section 163. The sections 162, 163 are disposed substantially orthogonal to each other, with the horizontal section 162 having a horizontal platter window 164 and the vertical section 163 having a split vertical window 165. From the perspective of the checkout clerk 122, the split vertical window 165 includes a left window 165L and a right window 165R. The left and right windows 165L, 165R are separated by a centrally located speaker grille 166.

The data reader 100 includes a top-down reader 167 that houses a downward-facing window 168 and artificial illumination source that directs illumination out through the window 168. The top-down reader 167 is described in U.S. Patent Application No. 61/657,634, titled Optical Scanner With Top Down Reader, filed Jun. 8, 2012, which is hereby incorporated by reference in its entirety.

The platter 144 includes both a lower platter section 170 and an upper platter section 171. The lower platter section 170 encompasses the horizontal platter window 164, which is disposed in a recessed position and preferably mounted flush with the surface 140 of the lower platter section 170. The platter 144 may include an optional bump, rail, or raised section 172 at one end to inhibit items (e.g., spherical fruit) from rolling or sliding off the surface 140. At the other end of the platter 144, located between the speaker grille 166 and the horizontal platter window 164, the platter 144 has a wedge-shaped platter section 173 made of plastic or other suitable material. The section 173 extends horizontally away from the window 165, tapering until its narrowest side 174 is coextensive with a length 175 of the horizontal platter window 164. The narrowest side 174 of the section 173 abuts a customer side 176 of the horizontal platter window 164. The section 173 wedges into a U-shaped portion 177 of the platter 144 to form the generally horizontal surface 140 of the lower platter section 170. The U-shaped portion 177 is commonly constructed of smooth or brushed stainless steel, but may also be constructed from plastic; sheet metals such as aluminum; or other materials, including ceramics.

The upper platter section 171 is located atop the vertical section 163, vertically displaced at a location higher than the lower platter section 170. The vertical displacement forms a multi-plane platter embodiment as in the All-Weighs® platter available from Datalogic ADC, Inc. of Eugene, Oreg., or as described in U.S. Pat. No. RE 40,071. Accordingly, in some embodiments, the platter 144 provides a weigh scale surface for the data reader 100 operating as a scanner-scale. Also, the aforementioned components of the data reader 100 are mounted (directly or indirectly) to a common base, housing, or chassis 180 in a checkstand lane or counter 184. In some embodiments, the platter 144 may comprise a structure that is readily removable from the chassis 180.

FIG. 2 shows the data reader 100 with internal imagers 202, 204, and 206 for acquiring images via each of the respective windows 164, 165L, 165R, and 168. The three imagers 202, 204, and 206 have associated optics (mirrors and lenses) to provide multiple perspectives for reading optical codes on the top side 150, the bottom side 152, the leading side 154, the trailing side 156, the customer side 160, and—depending on the view angle projected out via the window 164—the checker side 158. For example, the imager 206 of the top-down reader 167 produces a field of view 210 outward and through the window 168. The field of view 210 (or read volume) is an undivided perspective encompassing a centrally located portion of the lower platter section 170, and spanning across the surface area of the horizontal platter window 164 to ensure that optical codes located on the top side 150 can be read by the imager 206 as the item 120 passes through the read volume 210. Imagers 202 and 204 also each simultaneously produce separate read volumes (FIG. 3) to attempt to locate optical codes on various sides of the item 120 in order to minimize the possibility of a missed read.

The field of view 210 may be designed and selected depending on a number of factors such as the position of a post 220, depth of field and focal length of optics system(s), other characteristics of the imager 206, or the design of the checkstand counter 184. Furthermore, the read volume 210 is shown as a single, undivided perspective, but a field of view for each of the imagers 202, 204 and 206 may be subdivided into several sub-views using optical elements (not shown) that provide several perspectives for a single imager. An example imaging configuration is described in U.S. Patent Application No. 61/657,660, filed Jun. 8, 2012; and in U.S. patent application Ser. No. 13/895,258, filed May 15, 2013; which are hereby incorporated by reference in their entireties. Therefore, for purposes of this description, the term read volume may be described as any and all divided and undivided perspectives associated with an imager (or scanner). Furthermore, a read zone of the data reader 100 may be described as a three-dimensional region formed from any and all read volumes that may or may not partially overlap. In the example data reader 100, and as explained in detail with respect to FIG. 3, the read zone is formed from several read volumes approximately located above the platter window 164; toward the side of the checkout clerk 122 for the windows 165L, 165R; and within read volume 210.

FIG. 3 is a top plan view of the data reader 100, showing the platter 144 with its generally horizontal lower platter section 170 encompassing the platter window 164. A first integral feature 302 and an opposing second integral feature 304 each include a similar, chemically etched graphic pattern of circles 310, 311 bordering opposing peripheral sides 314, 316 of the platter window 164. From the vantage point of FIG. 3, the platter 144 is shown having a first platter end 320 proximal the customer 130, an opposing second platter end 326 proximal the checkout clerk 122, and a central section 330 including the etched graphic patterns 310, 311 between the first and second platter ends 320, 326 and located adjacent and along the lateral sides 314, 316 of the window 164.

Read volumes 332, 334, and 210 cooperatively establish the read zone. As the item 120 (FIGS. 1-2) is passed through the read zone, the read volume 334 provides a view that is split into a left perspective 334L and a right perspective 334R to provide images of the leading 154, the trailing 156, and the customer 160 sides, while the read volumes 210, 332 concurrently provide images for the respective top 150 and bottom 152 sides. Specifically, the read volume 334 projects from the slightly canted windows 165L, 165R to encompass the leading and trailing sides 154, 156. The read volume 210 covers the top side 150, as noted previously. The read volume 332 projects from the horizontal platter window 164 to encompass the bottom side 152. Other arrangements are possible, and read volumes are not exclusive to one side of an object. For example, the read volume 332 may encompass bottom, checker, left, and right sides.

Depending upon the size or position of the item 120 passed through the read zone, (e.g., typically dragged across the platter surface 140), it may be unlikely, difficult, or even impossible for the read zone to encompass all sides of the item 120. For example, an optical code borne on the checker side 158 may be entirely outside the read volume 332 associated with the imager 164. Therefore, the checkout clerk 122 may need to notice the optical code so that the item 120 can be reoriented and the optical code successfully read on its (reoriented) customer side 160. Thus, in some embodiments, another window and associated imager (not shown) is located to observe the checker side 150 and provide an enhanced checker-side read volume.

Assuming a user efficiently transports the item 120 through the read zone, each read volume 332, 334, and 210 will produce views of the item 120, but an inefficient sweep of the item 120 may result in fewer exposed sides of an item, resulting in an unsuccessful read if the optical code is located on an unexposed side. Therefore, the present inventors have recognized that users of a data reader could benefit from an intuitive system for indicating an efficient data-reading sweep region of the read zone. In a first embodiment, the reader platter is formed with indicia operative to maximize a first-pass read rate by ensuring users understand how to expose the maximum number of sides of an item in a read zone, thereby increasing the probability that the item will have its optical code successfully read within a single data-reading sweep across the read zone. For example, integral features 302, 304 delineate a preferred data-reading sweep region 338. A user who is ready to sweep the item 120 through the invisible read zone can immediately recognize that the direction of motion 136 will extend from a near side 340 of the first feature 302 to a far side 342 of the second feature 304 because the integral features 302, 304 provide a visual indication of a two-dimensional projection of the three-dimensional preferred data-reading sweep path through the read zone. This intuitive sweep path naturally encourages the user pass the item 120 above and across the horizontal platter window 164, and through each available read volume in the read zone. Consequently, the preferred data-reading sweep region 338 delineated by the first and second integral features 302, 304 ensures the item 120 is appropriately exposed to the read volume 332, 334, and 210.

Each integral feature 302, 304 has a minimum etched-pattern density 344 on its opposing sides 345, 346. The minimum etched-pattern density 344 gradually increases in density until reaching a maximum etched-pattern density 347 at a mid line mediolateral axis 348 of the features 302, 304. The increased etched-pattern density establishes a density gradient that reaches the maximum etched-pattern density 347 coincident with an optimal sweep path 349 in the preferred data-reading sweep region 338. A user can therefore intuitively recognize that the direction of motion 136 may follow the optimal sweep path 349, which further ensures that the maximum number item sides are viewable to imagers during a data-reading sweep.

Each etched graphic pattern 310, 311 includes a width 350 that is approximately as wide as the peripheral sides 314, 316 of the horizontal platter window 164. Additionally, each etched graphic pattern 310, 311 has a length 354 that is approximately as long as the length 175 of the horizontal platter window 164. Therefore, the first and second integral features 302, 304, in conjunction with the horizontal platter window 164, collectively establish a generally rectangular perimeter 360 of the preferred data-reading sweep region 338. The rectangular perimeter 360 is one example perimeter shape, but other perimeters are possible, depending on aesthetic choices, and depending on various configurations for the read zone. For example, integral features can be shaped to form various other non-rectangular peripheries, including opposing sides that taper, curve, or flare with respect to the peripheral sides 314, 316.

FIG. 4 is a sectional view taken along lines 4-4 of FIG. 3, showing diameters and relative depths of etched circles 400 that form the etched graphic pattern 310, 311 (FIG. 3) atop the generally horizontal surface 140 of the platter 144. The circles 400 may be chemically etched onto the stainless steel U-shaped portion 177 of the platter 144 according to the example chemical etch process set forth below, or by other suitable processes.

An example chemical etching process may comprise the following steps. First, masking material is applied to a clean metal substrate everywhere that is not intended to be etched. In this case, masking material is applied to the U-shaped portion 177 everywhere except for circular areas 400 (FIG. 4), which will be completely etched to form the pattern of circles 310, 311. Second, the substrate is placed on a conveyor system or other transport mechanism for transport through a chemical bath. Third, the substrate is subjected to a shower of chemical etching material, such as ferric chloride ($FeCl_3$) used for stainless steel. Etchant is allowed to dwell on the exposed substrate for a desired dwell time that determines the etching depth. The dwell time is dependent on factors such as specific etchant formulation and temperature. Fourth, the substrate is subjected to a shower of a chemical that removes the masking material from the substrate. In some processes, a fifth step may include a cleaning stage to remove etch chemicals or other residual materials, and an optional sixth step may include a buffing stage. Finally, an optional protective laminate is placed over the cosmetic surface, such as the surface 140 (FIG. 1).

In another embodiment, a photoresist process using liquid or dry photoresist material is used to create the etched graphic pattern 310, 311. Liquid photoresist films may include chemicals such as PMMA, PMGI, phenol formaldehyde resin, and SU-8. Dry film photoresists may include Riston®, Etertec®, Accuimage®, and PHOTOCAST. After masking, irradiation (typically UV irradiation), washing the irradiated mask, and etching, the photoresist masking is mechanically or chemically removed.

Etched bottom surfaces 410 include an increased surface roughness compared to platters with smoother surfaces (e.g., sheet metal). Edges defining etched areas provide mechanical interlocking between the platter 144 and items resting on the surface 140. These features inhibit items on the platter 144 from rolling, sliding, or inadvertently falling off. Additionally, the etched graphic pattern may withstand wear because the circles 400 are relatively small and recessed so that friction and wear generated by items sliding across the platter surface 140 is distributed across unetched portions of the surface 140, leaving etched bottom surfaces 410 relatively unaffected by repetitive sliding, wear, and extended use.

Ambient light occasionally provides sufficient illumination for the data reader 100, but as noted above, additional artificial illumination may be provided to illuminate items in portions of the read zone. The highly reflective surfaces, such as stainless steel platter surfaces, may reflect the illumination from the light source into the eyes of a customer or checker and cause the customer or checker discomfort and distraction, particularly when the artificial light source is flashed or cycled on and off. Thus, the present inventors have developed systems and methods to reduce reflected light from illumination sources of data readers from reaching the sight lines of the operator or of the customer. According to one embodiment, the etched graphic pattern 310, 311 provides surface roughness that diffusively distributes specular reflection otherwise associated with a smoother surface such as a stainless steel platter or other reflective material. For example, the specular reflection from the bottom surfaces 410 of the etched circles 400 is reduced by as much as fifty percent (i.e., a factor of two) resulting in an antireflective effect. In another embodiment, the bottom surfaces 410 may include opaque coatings, or coatings to absorb light.

FIG. 5 is an enlarged sectional view from a region designated in FIG. 4, illustrating in greater detail a depth 510 of the etched circles 400. According to one embodiment, the etched graphic pattern 310, 311 is etched to a depth in a range from approximately 0.025 millimeters to approximately 0.1 millimeters. The etch process removes metal evenly so that each circle 400 has the relatively flat bottom surface 410 and the fairly consistent depth 510. Some embodiments, however, may include circles with depths that vary across bottom surfaces. For example, FIG. 6 is a sectional view similar to that of FIG. 4, but showing another embodiment of a platter 604 with laser etched or milled circles 600 configured to provide a similar pattern of circles as described above. The circles 600 in this example have slightly curved bottom surfaces 610. Additionally, a maximum depth 640 of the circles 600 is a function of diameter, which increases as the diameter of circles 600 increases.

In one example construction, the circles 600 are formed with maximum depth at a location indicating the optimal sweep path 349 in the preferred data-reading sweep region 338. The circles 600 have maximum density due to the diameters of the circles increasing based on a gradient, as previously discussed with respect to FIG. 3. Other gradients and etched-pattern densities may be employed, however. For example, FIG. 7 is an enlarged fragmentary top plan view of a first integral feature 702 of a platter 710. The feature 702 includes a graphic pattern 720 with an etched-pattern density gradient according to another embodiment. The gradient is essentially the inverse of that shown in FIGS. 1-6. The gradient starts from a maximum etched-pattern density 750 at opposing sides 752, 754 and gradually reaches a minimum etched-pattern density 760 toward a center, mediolateral axis 770.

Figure 8:
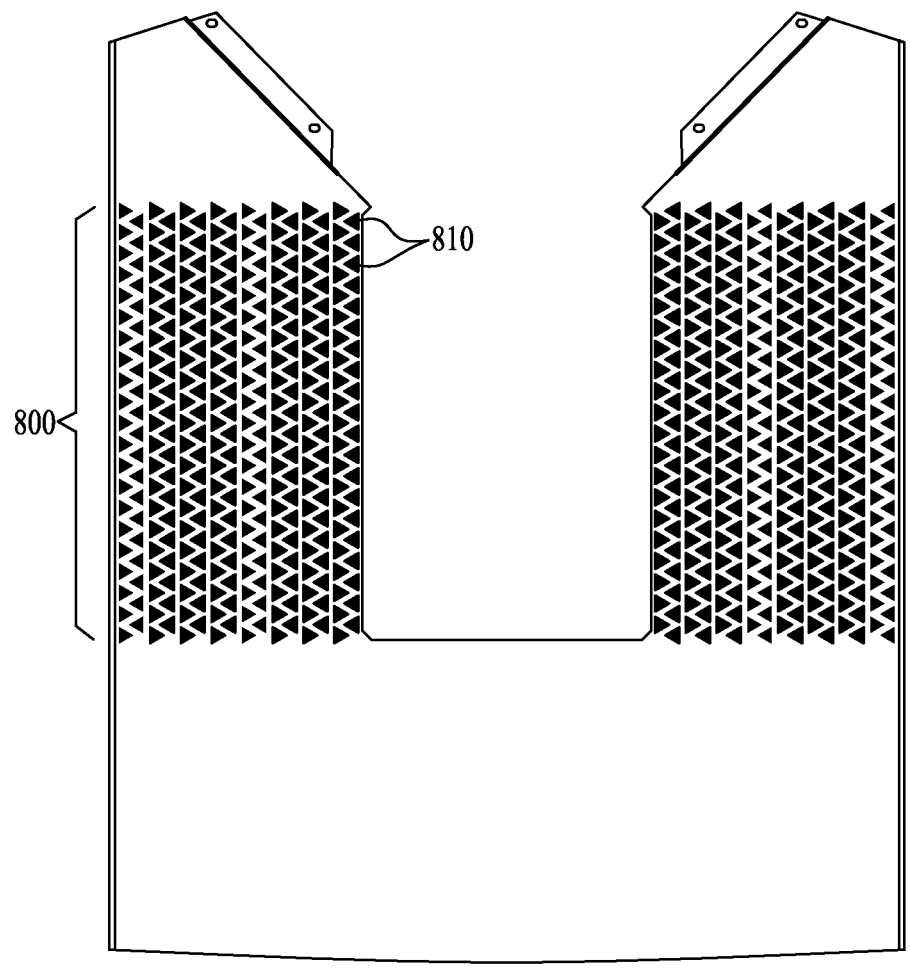
FIG. 8 is a top plan view of a portion of a platter, showing a graphic pattern according to another embodiment.

Other embodiments may include a uniform etched-pattern density throughout the first and second integral features. Moreover, other types of etched graphic patterns may be used. For example, FIG. 8 is an enlarged fragmentary top plan view of an integral feature 800 that includes an etched graphic pattern of triangles 810 having a uniform etched-pattern density throughout. In still other embodiments, particularly when antireflection is of less concern, outlines of shapes may be etched instead of fully etched circles, triangles, or other shapes, thereby leaving center portions of the substrate intact.

Figure 9:
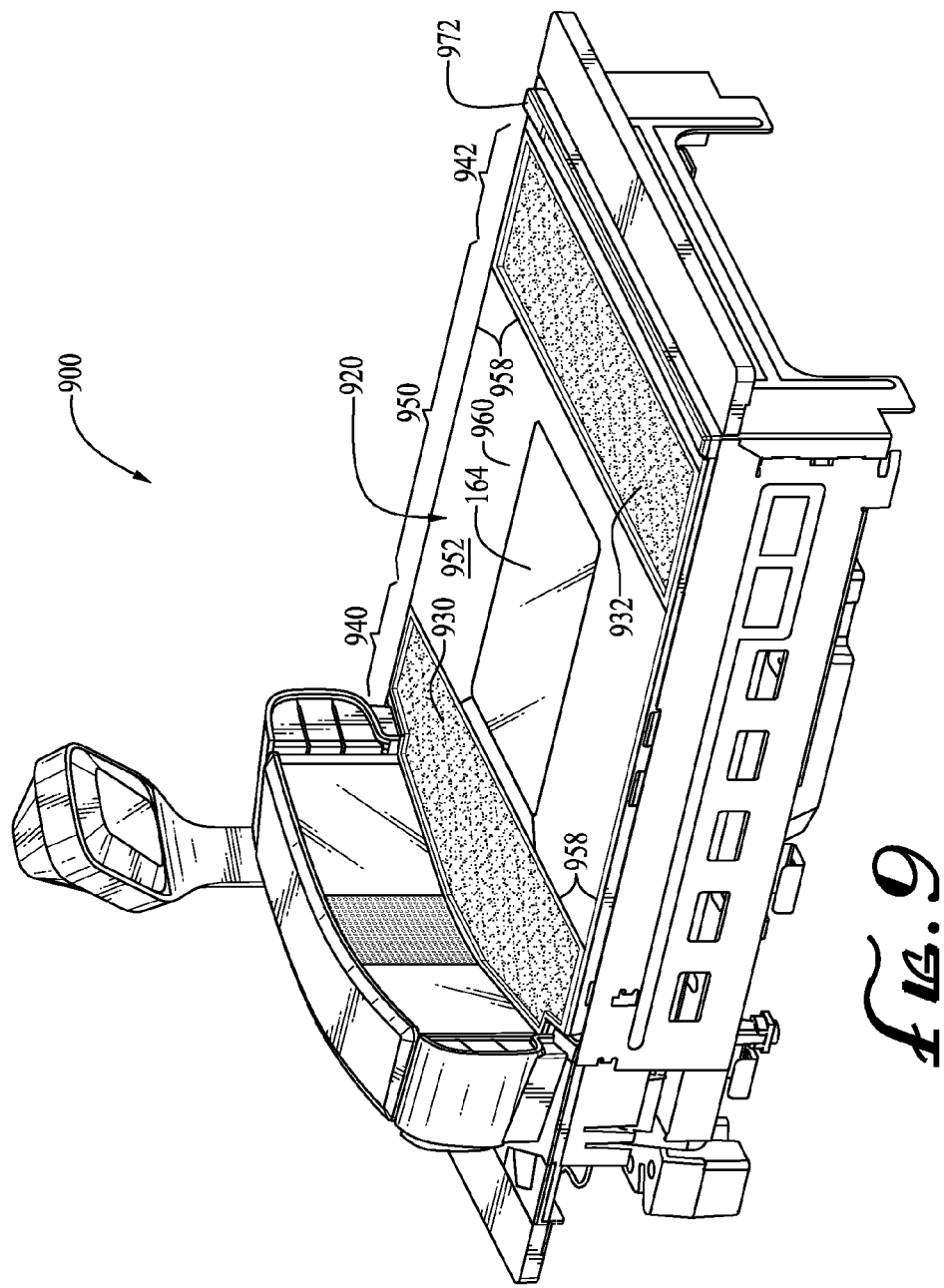
FIG. 9 is a top isometric view of a data reader illustrating a preferred data-reading sweep region of a read zone, according to a second embodiment.

FIG. 9 shows a data reader 900, according to another embodiment. The data reader 900 has a platter 920 including opposing first and second depressed regions 930, 932 configured to indicate opposing keep-out zones 940, 942 that are each disposed across the length of the platter 920 on opposite sides of the window 164. A central section 950 of the platter 920 has a generally horizontal surface 952 configured to delineate a periphery 958 of a preferred data-reading sweep region 960 across a read zone that is similar to the read zone of FIG. 3. The depressed regions 930, 932 (or other suitable features) are placed in areas of the platter 920 where imaging and reading is less efficient as described above, i.e., where reads are less likely to be successful due to one or more read volumes having occluded views, items being transported out of the nominal focal range, or the read volume missing sides of an item.

The keep-out zones 940, 942 are implemented using one or more slightly recessed uniform flat regions that extend in a direction along the length of the central section 950. The depressed regions 930, 932 establish abrupt edges that make it more difficult for a user to simply slide items over the keep-out zones 940, 942. For example, the depressed regions 930, 932 may be stamped regions in stainless steel, or may be concave depressions. Because of the discontinuity in surface height between the central section 950 and the keep-out zones 940, 942, a user is encouraged to confine movement of items to within the region 960 delineated by the central section 950 as that region 960 does not have features to impede movement (e.g., sliding) through the read zone. Surface treatments may also be included in major surfaces of the keep-out zones 940, 942 to further encourage a user to move items through the preferred data-reading sweep region.

The depressions may additionally be useful for holding round items such as apples or oranges to keep them from rolling on the surface when, for example, the data reader 900 is a data reader-scale device, which utilizes the horizontal surface both for scanning and weighing. Additionally, the depressed regions 930, 932 include optional surface treatments (e.g., etching) or contours to provide additional surface roughness that reduces specular reflection, and increases friction and interlocking, as described above. In other embodiments, the keep-out zones can be raised regions including mutually spaced apart bumps, ridges, or multiple rails similar that of rail 972.

The aforementioned embodiments of a data reader are described in a retail setting that should not be considered limiting. Other uses for data readers with the characteristics and features as described may be possible, for example, industrial locations such as a parcel distribution (e.g., postal) station are contemplated and within the scope of the present disclosure. Furthermore, though examples are provided primarily with respect to a checker-assisted data reader, the systems and methods may be employed in a self-checkout system or in an automatic reader, such as a tunnel or portal data reader employing multiple housing portions configured to obtain multiple perspectives of an item via multiple imager-view windows. Finally, skilled persons should understand that many changes may be made to the details of the above-described embodiments, without departing from the underlying principles of this disclosure. For example, keep-out zones 940, 942 may be used in conjunction with the etched graphic pattern of circles 310, 311 in some embodiments. Thus, the scope of the present invention should be determined only by the following claims.

The invention claimed is:

1. A data reading system for reading items passed through a read zone, the data reading system comprising:
    a housing;
    a platter supportable on the housing and having a horizontal surface; and
    a platter window disposed in the platter;
    in which the platter includes a first integral feature and a second integral feature in spaced-apart relation bordering opposing peripheral sides of the platter window, the first and second integral features positioned and configured to cooperatively delineate a preferred data-reading sweep path through the read zone and to reduce specular reflection from the horizontal surface of the platter by diffusing reflected light away from a user operating the data reading system.

2. A data reading system according to claim 1, in which the first and second integral features comprise an etched graphic pattern, and in which the platter further comprises:
    first and second platter ends each having lengths extending in a direction parallel to the preferred data-reading sweep path through the read zone; and
    a central section positioned between the first and second platter ends, the central section including an upper surface forming a portion of the horizontal surface of the platter, the upper surface including the etched graphic pattern.

3. A data reading system according to claim 2, in which the etched graphic pattern includes a portion having a width extending in a direction that is perpendicular to the preferred data-reading sweep path through the read zone, the width being at least as wide as the opposing peripheral sides of the platter window.

4. A data reading system according to claim 2, in which the central section comprises stainless steel and in which the etched graphic pattern comprises an etched pattern of circles atop the horizontal surface, the etched pattern of circles including a first etched-pattern density and a second etched-pattern density, the first etched-pattern density positioned to indicate an optimal path of item flow across the read zone and the second etched-pattern density positioned proximal the first and second platter ends.

5. A data reading system according to claim 4, in which the etched pattern of circles are chemically or laser etched onto the stainless steel.

6. A data reading system according to claim 2, in which the etched graphic pattern is etched into the horizontal surface at an etch depth in a range from about 0.025 millimeters to about 0.1 millimeters.

7. A data reading system according to claim 1, in which the platter includes a first surface roughness and the first and second integral features include a second surface roughness that is greater than the first surface roughness to diffuse reflected light away from a user operating the data reading system.

8. A data reading system according to claim 7, in which the first and second integral features have a specular reflection that is approximately fifty percent less than a stainless steel platter having a roughness consisting essentially of the first surface roughness.

9. A data reading system according to claim 1, in which the first integral feature includes a first depressed region and the second integral feature includes a second depressed region, and in which the platter comprises:
    a first platter end including the first depressed region indicating a first keep-out zone;
    a second platter end including the second depressed region indicating a second keep-out zone; and
    a central section positioned between the first and second platter ends to define a horizontal surface that is substantially coplanar with a surface of the platter window.

10. A data reading system according to claim 9, in which the first platter end includes opposing stainless steel segments and a plastic segment therebetween, in which the first integral feature is formed from contiguous portions of the opposing stainless steel segments and the plastic segment.

11. A data reading system according to claim 9, in which the platter is metal and at least one of the first or the second depressed regions is stamped or etched in the metal.

12. A data reading system according to claim 9, in which the first integral feature includes a first ribbed region and the second integral feature includes a second ribbed region.

13. A data reading system according to claim 1, in which the platter comprises a weigh platter.

14. A method of data reading comprising:

forming a read zone over a horizontal platter of a data reader;

indicating to a user to move an item through/along a preferred read zone path through the read zone by including integral features in a platter surface of the horizontal platter that are configured to designate the preferred read zone path;

illuminating a portion of the read zone and the platter surface; and suppressing specular reflection of illumination reflected from the platter surface by including a surface treatment on the platter surface to form the integral features and diffuse reflected light away from a user operating the data reader.

15. A method according to claim 14, in which the integral features comprise an etched graphic pattern or recessed areas of the platter surface.

16. A method according to claim 14, in which the surface treatment comprises chemical or laser etching.

17. A method according to claim 14, further comprising suppressing specular reflection by a factor of two compared to a stainless steel platter that does not include the surface treatment.

18. A method according to claim 14, further comprising including the integral features in a direction along a length of the read zone and bordering opposing peripheral sides of a platter window.

* * * * *

UNITED STATES PATENT AND TRADEMARK OFFICE
CERTIFICATE OF CORRECTION

PATENT NO.        : 9,218,516 B2
APPLICATION NO.   : 13/911850
DATED             : December 22, 2015
INVENTOR(S)       : Ryan B. Thompson et al.

Page 1 of 1

It is certified that error appears in the above-identified patent and that said Letters Patent is hereby corrected as shown below:

Specification

Column 2
Line 59, insert --of-- after "portion".

Column 6
Line 13, change "imager 164" to --imager 202--.
Line 18, change "150" to --158--.
Line 43, insert --to-- after "user".

Column 9
Line 34, insert --to-- after "similar".

Signed and Sealed this
Thirty-first Day of May, 2016

Michelle K. Lee
*Director of the United States Patent and Trademark Office*